US008654769B2

(12) United States Patent
Mentze et al.

(10) Patent No.: US 8,654,769 B2
(45) Date of Patent: Feb. 18, 2014

(54) CONVERGENCE OF MULTICAST TRAFFIC IN RESPONSE TO A TOPOLOGY CHANGE

(75) Inventors: Duane Edward Mentze, Roseville, CA (US); Suganya John Bosco Sesu Annamary, Bangalore (IN); Beeram Suresh Kumar Reddy, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 369 days.

(21) Appl. No.: 12/946,241

(22) Filed: Nov. 15, 2010

(65) Prior Publication Data

US 2012/0120950 A1 May 17, 2012

(51) Int. Cl.
*H04L 12/28* (2006.01)
*H04L 12/56* (2011.01)

(52) U.S. Cl.
CPC .......... *H04L 45/16* (2013.01); *H04L 45/00* (2013.01); *H04L 49/201* (2013.01)
USPC ........... 370/390; 370/216; 370/217; 370/218; 370/219; 370/220; 370/221; 370/222; 370/225; 370/254; 370/255; 370/256; 370/257; 370/258; 370/312; 370/389; 370/400; 370/408

(58) Field of Classification Search
None
See application file for complete search history.

(56) References Cited

U.S. PATENT DOCUMENTS

| | | | | |
|---|---|---|---|---|
| 6,331,983 | B1 * | 12/2001 | Haggerty et al. | 370/400 |
| 6,370,142 | B1 * | 4/2002 | Pitcher et al. | 370/390 |
| 7,719,959 | B2 | 5/2010 | Shah et al. | |
| 2002/0120769 | A1 * | 8/2002 | Ammitzboell | 709/238 |
| 2002/0122390 | A1 * | 9/2002 | Garff et al. | 370/252 |
| 2006/0029001 | A1 * | 2/2006 | Mensch et al. | 370/254 |
| 2006/0062159 | A1 * | 3/2006 | Jensen | 370/255 |
| 2006/0176804 | A1 * | 8/2006 | Shibata | 370/217 |
| 2007/0133530 | A1 * | 6/2007 | Previdi et al. | 370/390 |
| 2007/0140107 | A1 | 6/2007 | Eckert et al. | |
| 2007/0189193 | A1 * | 8/2007 | Previdi et al. | 370/256 |
| 2007/0253416 | A1 | 11/2007 | Raj | |
| 2008/0259913 | A1 * | 10/2008 | Shah et al. | 370/386 |
| 2009/0161670 | A1 | 6/2009 | Shepherd et al. | |
| 2009/0185563 | A1 * | 7/2009 | Zhu et al. | 370/390 |
| 2009/0213855 | A1 * | 8/2009 | Xu | 370/390 |
| 2010/0054246 | A1 | 3/2010 | Shah et al. | |
| 2011/0051643 | A1 * | 3/2011 | Hans et al. | 370/311 |

FOREIGN PATENT DOCUMENTS

WO    WO-2008/031342    3/2008

OTHER PUBLICATIONS

W. Fenner, "Request for Comments: 2236", Nov. 1997, Network Working Group.*
Cain et al., "Request for Comments: 3376", Oct. 2002, Network Working Group.*
Deering et al., "Request for Comments: 2710", Oct. 1999, Network Working Group.*
Tam, Adrian S.-W., et al., "A Fast Reroute Scheme for IP Multicast", Department of Electrical and Computer Engineering, Polytechnic Institute of New York University, *IEEE "GLOBECOME" 2009 proceedings*, (2009) 7 pgs.

* cited by examiner

*Primary Examiner* — Ayaz Sheikh
*Assistant Examiner* — Peter Chau

(57) ABSTRACT

A method for convergence of multicast traffic in response to a topology change. The method includes, in response to a change in a multicast topology, redirecting multicast traffic through a network device of a plurality of network devices in the multicast topology and determining a querier status of the network device. The method also includes flooding the multicast traffic through an interface to the network device to facilitate convergence of the multicast traffic. The interface is a connecting point between the network device and another network device of the plurality of network devices.

19 Claims, 3 Drawing Sheets

CONVERGENCE OF MULTICAST TRAFFIC IN RESPONSE TO A TOPOLOGY CHANGE

BACKGROUND

Typically, in a multicast topology, a receiver receives multicast data from a source via a plurality of network devices. If the topology changes, the receiver may not receive multicast data until the path to the receiver is converged. In some instances, it may take minutes for the convergence.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Figure 1:
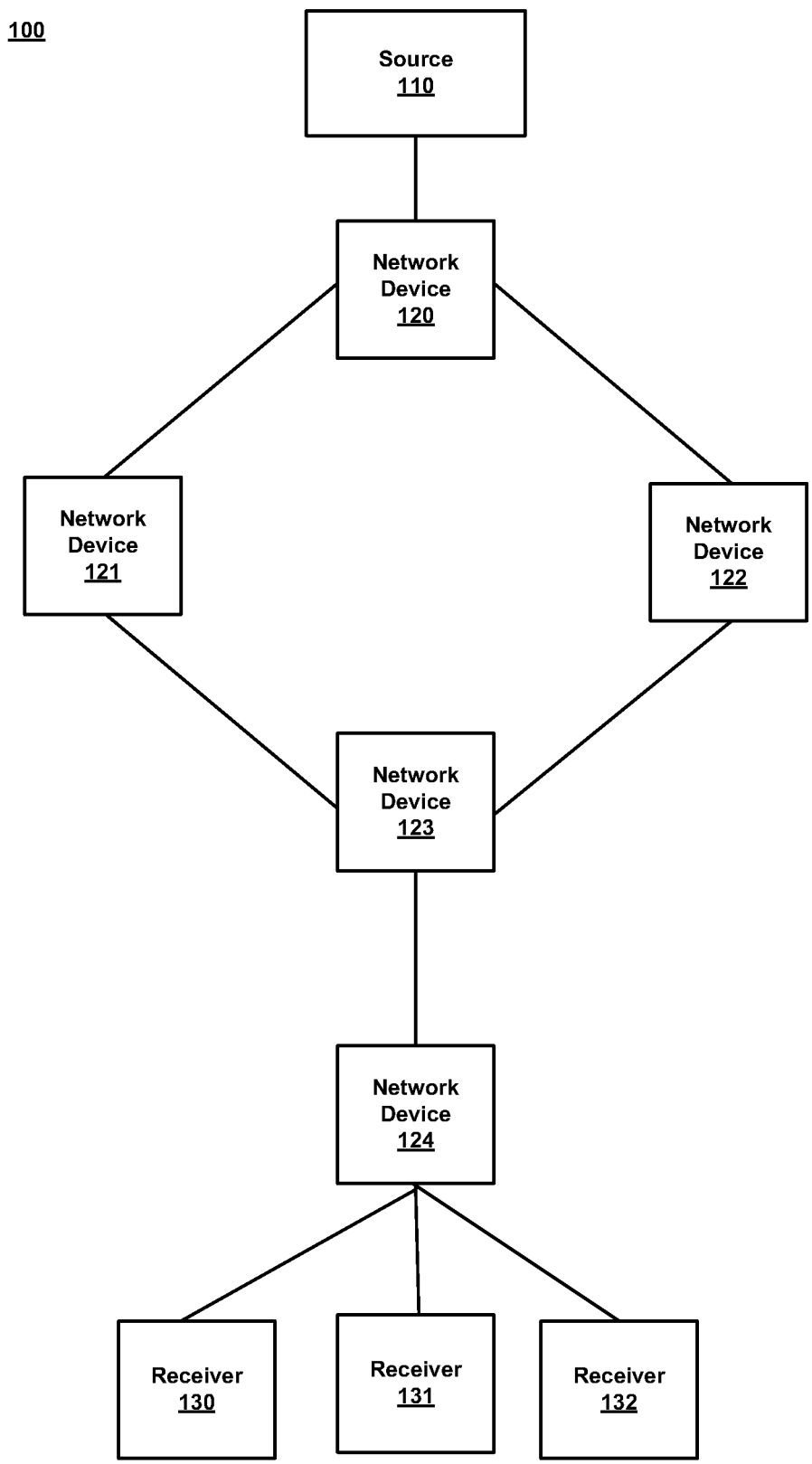
FIG. 1 illustrates an example of a network, in accordance with an embodiment of the present system.

FIG. 1 depicts a network 100, in accordance to an embodiment of the present system. Network 100 includes source 110, network devices 120-124 and receivers 130-132. It should be appreciated that network 100 includes any number of network devices (e.g., switches) that allow for the transmission of data from a source(s) to any number of receivers.

Source 110 is configured to be a source of data to be transmitted to receivers 130-132. In one embodiment, source 110 is or includes a database of multicast data.

Network devices 120-124 are configured to facilitate in transmission of data from source to receivers 130-132. In various embodiments, network devices 120-124 are real or virtual network switches. In other words, network devices 120-124 are an aggregator of interfaces allowing devices to communication to one another.

Receivers 130-132 are configured to receive data from source 110. Receivers 130-132 can be any computing device such as, but not limited to, a desktop computer, a cell phone, etc.

In one embodiment, network 100 is a non-routed environment. For example, network 100 is a virtual local area network (VLAN).

In various embodiments, network 100 is configured to allow multicast traffic to be transmitted from source 110 to a receiver, such as, receiver 130. In general, multicast is the delivery of a message or information to a group of destination computers (e.g., receivers 130-132) simultaneously in a single transmission from source 110.

The network topology of network 100 is the layout pattern of interconnections of the various elements (e.g., source 110, network devices 120-124 and receivers 130-132). It should be appreciated that network 100 can include any number of network topologies that allow the transmission of data from source 110 to receivers 130-132.

In one embodiment, the topology of network 100 includes a loop. For example, network devices 120-123 form a loop. Accordingly, there is more than one path from source 110 to receivers 130-132. For example, multicast data travels to receivers 130-132 via network devices 120, 121, 123 and 124, when the path through network device 122 is blocked. In another example, multicast data can travel to receivers 130-132 via network devices 120, 122, 123 and 124, when the path through network device 121 is blocked.

Network devices 120-124 utilize Internet Group Management Protocol (IGMP) and/or Multicast Listener Discovery (MLD). IGMP and MLD are a part of the Multicast Group Membership Discovery (MGMD) protocols. IGMP and MLD are essentially the same protocol. In particular, IGMP is used for Internet Protocol Version 4 (IPv4) multicast groups and MLD is used for Internet Protocol Version 6 (IPv6) multicast groups. It is noted that IGMP and MLD are non-proprietary protocols.

Moreover, network devices 120-124 utilize non-proprietary protocols to facilitate in changing the path from source 110 to receivers 130-132 as a result of a topology change. Such protocols can be, but are not limited to, Multiple Spanning Trees Protocol (MSTP), Rapid Spanning Tree Protocol (RSTP), loop protect, etc. The changing of the path from source 110 to receivers 130-132 as a result of a topology change is described in detail below.

Accordingly, interoperability of network devices of embodiments of the present system is assured due to the utilization/enabling of non-proprietary protocols. In contrast, conventional network devices in a multicast network topology utilize proprietary protocols.

Figure 2:
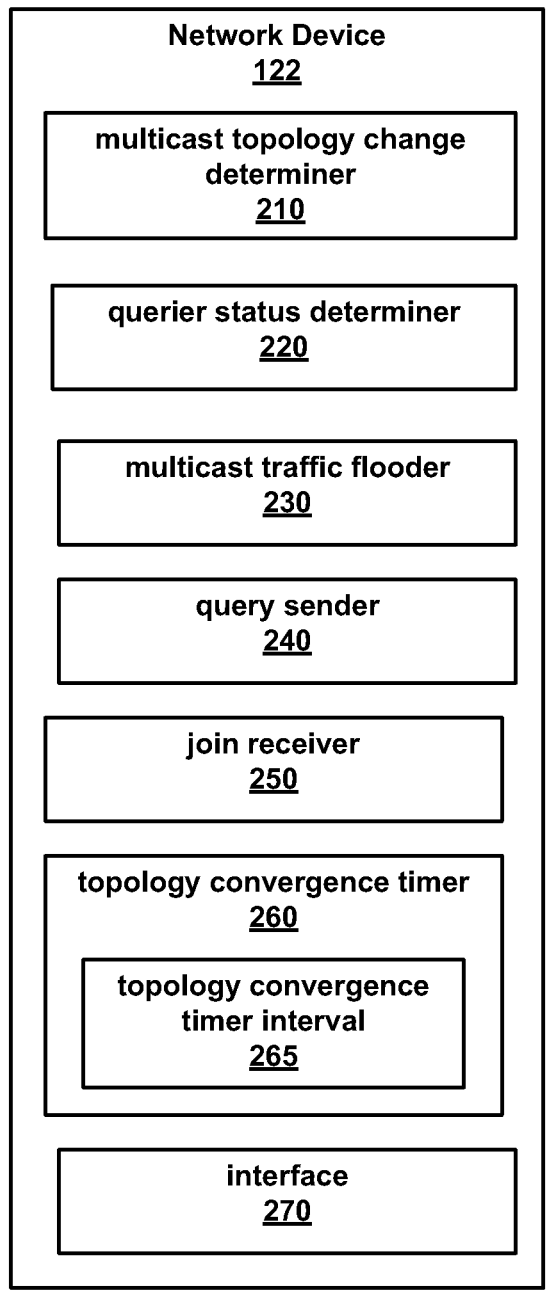
FIG. 2 illustrates an example of a network device, in accordance with an embodiment of the present system.

FIG. 2 depicts an embodiment of network device 122, in accordance to an embodiment of the present system. It should be appreciated that network device 122 can be any network device (e.g., network devices 120, 121, 123, 124). However, for brevity and clarity, network device 122 is depicted in FIG. 2 and described in detail below.

Network device 122 includes multicast topology change determiner (MTCD) 210, querier status determiner 220, multicast traffic flooder 230, query sender 240, join receiver 250 and topology convergence timer 260.

MTCD 210 is configured to determine a change in multicast topology, wherein the multicast traffic is redirected through a network device (e.g., network device 122) based on a change in multicast topology. For example, an initial topology of network 100 allows traffic to flow to receivers 130-132 via network devices 120, 121, 123 and 124 by blocking the path or link between network devices 122 and 123. If the path through network devices 120, 121, 123 and 124 is changed (e.g., network device 121 fails), then the multicast topology changes such that the multicast traffic is redirected through network device 122. Accordingly, MTCD 210 determines the change in the multicast topology.

Querier status determiner 220 is configured to determine a querier status of the network device (e.g., network device 122). For example, if the multicast traffic is redirected through network device 122, then querier status determiner 220 determines whether or not network device 122 is a querier or a non-querier.

Query sender 240 is configured to send a general query in response to network device 122 acting as a querier. In one embodiment, network device 122 sends a general query through interface 270. In this embodiment, interface 270 is associated with network device 123. In general, an interface is a connecting point between two network devices. Further description of network device 122 acting as a querier is provided below.

Join receiver 250 is configured to receive joins from receivers 130-132. It should be appreciated that both network devices acting as a querier and a non-querier listens for joins. The handling of joins is a standard part of IGMP/MLD. In particular, a querier transmits a query (in response to a topology change) to all devices (e.g., receivers) and solicits joins from all devices. The querier will modify its normal scheduling of sending queries in the presence of a topology change to accelerate convergence. In various embodiments, any combination of receivers 130-132 (or none of receivers 130-132) respond to the queries by joins.

Multicast traffic flooder 230 is configured to flood multicast traffic in interface 270 in response to the determination of the querier status of network device 122. For example, the multicast traffic is flooded through interface 270 to receivers 130-132.

Topology convergence timer 260 is configured to time convergence of the multicast traffic. In one embodiment, topology convergence timer 260 is started in response to flooding of multicast traffic by multicast traffic flooder 230.

Topology convergence timer 260 includes topology convergence timer interval (TCTI) 265. TCTI 265 determines the expiration of topology convergence timer 260. In other words, at the end of TCTI 265, it can be assumed that the state of the new port or interface is relearned.

It should be appreciated that the flooded multicast traffic is received by receivers 130-132 via interface 270 during TCTI 265. In contrast, in conventional multicast networks, multicast traffic is flooded through all interfaces. Moreover, the receivers do not receive the multicast traffic during the TCTI.

In one embodiment, TCTI 265 is set to a predetermined time specific to querier network devices. For example, during TCTI 265, a querying network device is able to send out general queries at an accelerated pace and the receivers soliciting multicast data are able to respond with joins to the query. In such an embodiment, TCTI 265 can be determined by:

$$(\text{robustness variable}) \times (\text{query response time}) - (\text{default values}). \quad (1)$$

For example, in one embodiment, TCTI 265 is 20 seconds based on a robustness variable of 2 and a query response time of 10 seconds.

In another embodiment, TCTI 265 is set to a predetermined time specific to non-querier network devices. It should be appreciated that during TCTI 265, the non-querying network device replays the joins on the interface with the topology change. For instance, when joins are received by the non-querying network device from one direction, the joins are forwarded in the opposite direction in the direction of a querier. Thus, the querier is able to receive the joins from the receivers.

In such an embodiment, TCTI 265 can be determined by:

$$(\text{query interval}) + (\text{query response interval}) - (\text{default values}). \quad (2)$$

For example, in one embodiment, TCTI 265 is 125 seconds.

In response to expiration of topology convergence timer 260, multicast traffic flooder 230 stops flooding traffic.

Moreover, the multicast data is forwarded to receivers 130-132 through interface 270, if joins were received from receivers 130-132 in interface 270 during the running of topology convergence timer 260.

Figure 3:
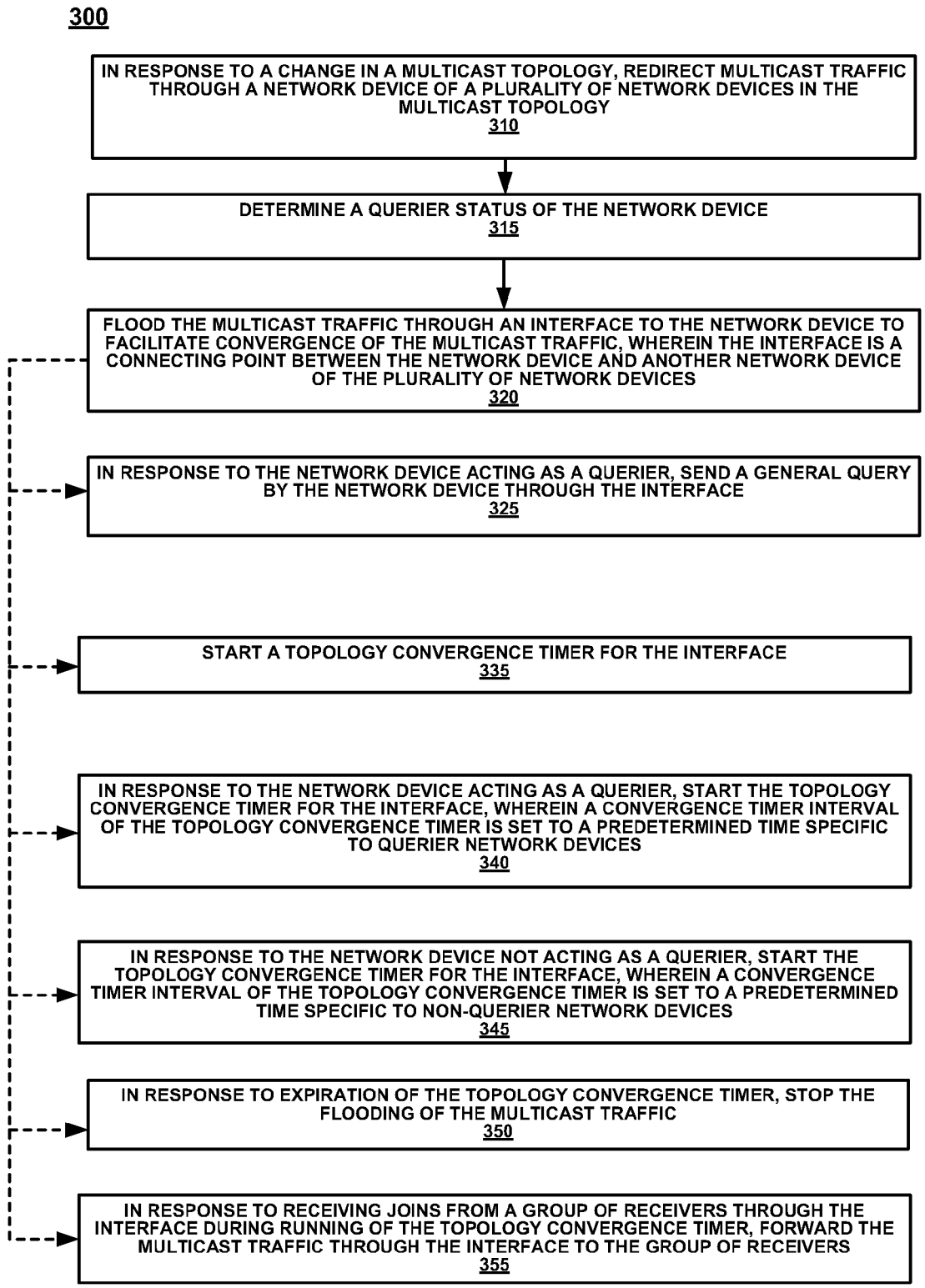
FIG. 3 illustrates an example of a method for convergence of multicast traffic in response to a topology change, in accordance with an embodiment of the present system.

FIG. 3 depicts a method 300 for convergence of multicast traffic in response to a topology change, in accordance with an embodiment of the present system. In one embodiment, method 300 is carried out by processors and electrical components under the control of computer readable and computer executable instructions. The computer readable and computer executable instructions reside, for example, in a non-transitory computer readable data storage medium such as computer readable/usable volatile or non-volatile memory. However, the computer readable and computer executable instructions may reside in any type of computer readable storage medium. In some embodiments, method 300 is performed at least by network device 122 described in FIGS. 1 and 2. In one such embodiment, the computer readable and executable instructions are thus carried out by a process and/or other components of network device 122.

At 310, in response to a change in a multicast topology, multicast traffic is redirected through a network device of a plurality of network devices in the multicast topology. For example, if multicast data is directed through network device 121 (while interface 270 between network device 122 and network device 123 is blocked) and network device 121 subsequently fails, then the multicast traffic is redirected through network device 122.

At 315, a querier status of the network device is determined. For example, querier status determiner 220 determines whether network device 122 is acting as a querier or a non-querier.

At 320, the multicast traffic is flooded through an interface to the network device to facilitate convergence of the multicast traffic, wherein the interface is a connecting point between the network device and another network device of the plurality of network devices. For example, in response to determining whether or not network device 122 is a querier or non-querier, multicast traffic flooder 230 floods multicast traffic through interface 270 (that is unblocked due to the failure of network device 121).

In one embodiment, at 325, in response to the network device acting as a querier, a general query is sent by the network device through the interface. For example, in response to network device 122 acting as a querier, network device 122 sends a general query through interface 270 in the direction of receivers 130-132.

At 335, a topology convergence timer for the interface is started. For example, topology convergence timer 260 is started in response to multicast traffic flooder 230 flooding interface 270.

In one embodiment, at 340, in response to the network device acting as a querier, the topology convergence timer for the interface is started, wherein a convergence timer interval of the topology convergence timer is set to a predetermined time specific to querier network devices. In one such embodiment, TCTI 265 is set for 20 seconds.

In another embodiment, at 345, in response to the network device not acting as a querier, the topology convergence timer for the interface is started, wherein a convergence timer interval of the topology convergence timer is set to a predetermined time specific to non-querier network devices. In one such embodiment, TCTI 265 is set for 125 seconds.

At 350, in response to expiration of the topology convergence timer, the flooding of the multicast traffic is stopped. For example, when topology convergence timer 260 expires, the flooding of the multicast traffic is stopped by multicast traffic flooder 230. It should be appreciated that, at the expiration of topology convergence timer 260, the state of the port or interface is relearned. Accordingly, the state of the port or interface is relearned during a shorter amount of time if network device 122 is a querier rather than a non-querier.

At 355, in response to receiving joins from a group of receivers through the interface during running of the topology convergence timer, the multicast traffic is forwarded through the interface to the group of receivers. For example, if receivers 130-132 send joins to receive multicast data during the running of topology convergence timer 260, then receivers 130-132 receive the multicast data from source 110.

Various embodiments of the present system are thus described. While the present system has been described in particular embodiments, it should be appreciated that the present system should not be construed as limited by such embodiments, but rather construed according to the following claims.

The invention claimed is:

1. A method for convergence of multicast traffic in response to a topology change, said method comprising:
   in response to a change in a multicast topology, receiving multicast traffic at a network device;
   determining, by the network device, a querier status of said network device;
   in response to a determination by the network device that the network device is to act as a querier, flooding, during a first time interval, said received multicast traffic to a group of receivers through an interface of said network device to facilitate a convergence of said received multicast traffic; and
   in response to a determination by the network device that the network device is to act as a non-querier, flooding, during a second time interval, said received multicast traffic to the group of receivers through the interface of said network device to facilitate the convergence of said received multicast traffic, wherein the second time interval is different from the first time interval.

2. The method of claim 1, further comprising:
   in response to said network device acting as a querier, sending a general query by said network device through said interface.

3. The method of claim 1, further comprising:
   starting the first or second time interval by a topology convergence timer upon the flooding of the received multicast traffic.

4. The method of claim 1,
   wherein the first time interval is based on a query response time and a robustness variable.

5. The method of claim 1,
   wherein the second time interval is based on a sum of a query interval and a query response interval.

6. The method of claim 3, further comprising:
   in response to an expiration of the first or second time interval, stopping said flooding of said received multicast traffic.

7. The method of claim 3, further comprising:
   in response to receiving joins from the group of receivers through said interface during the first time interval, forwarding said received multicast traffic through said interface to said group of receivers.

8. A network device comprising:
   a multicast topology change determiner to determine a change in multicast topology, wherein multicast traffic is redirected through said network device based on said change in multicast topology;
   a querier status determiner to determine a querier status of said network device; and
   a multicast traffic flooder to flood, during a first time interval, said multicast traffic to a group of receivers through an interface of said network device in response to a determination by the querier status determiner that the network device is to act as a querier, and to flood, during a second time interval, said multicast traffic to the group of receivers through the interface of said network device in response to a determination by the querier status determiner that the network device is to act as a non-querier, wherein the second time interval is different from the first time interval.

9. The network device of claim 8, further comprising:
   a query sender to send a general query in response to said network device acting as a querier.

10. The network device of claim 8, further comprising:
    a join receiver to receive joins from the group of receivers in response to said network device acting as a non-querier.

11. The network device of claim 8, further comprising:
    a topology convergence timer to be set to the first or second time interval for a convergence of said multicast traffic based on the determination of the querier status of the network device.

12. The network device of claim 11, wherein the second time interval is based on a sum of a query interval and a query response interval.

13. The network device of claim 11, wherein the first time interval is based on a query response time and a robustness variable.

14. The network device of claim 8, wherein non-proprietary protocols are enabled on said network device, wherein said non-proprietary protocols are selected from a group consisting of: Internet Group Management Protocol (IGMP) and Multicast Listener Discover (MLD).

15. A non-transitory computer readable storage medium on which is stored computer readable instructions which when executed by a processor cause a network device to:
    receive multicast traffic in response to a change in a multicast topology;
    determine a querier status of the network device;
    in response to a determination by the network device that the network device is to act as a querier, flood, during a first time interval, the received multicast traffic to a group of receivers through an interface of the network device to facilitate a convergence of the received multicast traffic; and
    in response to a determination by the network device that the network device is to act as a non-querier, flood, during a second time interval, the received multicast traffic to the group of receivers through the interface of the network device to facilitate the convergence of the received multicast traffic, wherein the second time interval is different from the first time interval.

16. The non-transitory computer readable storage medium of claim 15, wherein the first time interval is based on a query response time and a robustness variable.

17. The non-transitory computer readable storage medium of claim 15, wherein the second time interval is based on a sum of a query interval and a query response interval.

18. The non-transitory computer readable storage medium of claim 15, wherein the computer readable instructions, when executed by the processor, further cause the network device to:
   start the first or second time interval upon the flooding of the received multicast traffic.

19. The non-transitory computer readable storage medium of claim 18, wherein the computer readable instructions, when executed by the processor, further cause the network device to:
   in response to an expiration of the first or second time interval, stopping the flooding of the received multicast traffic.

\* \* \* \* \*